F. STUART.
LOG BUNDLER.
APPLICATION FILED OCT. 8, 1910.
998,651.
Patented July 25, 1911.
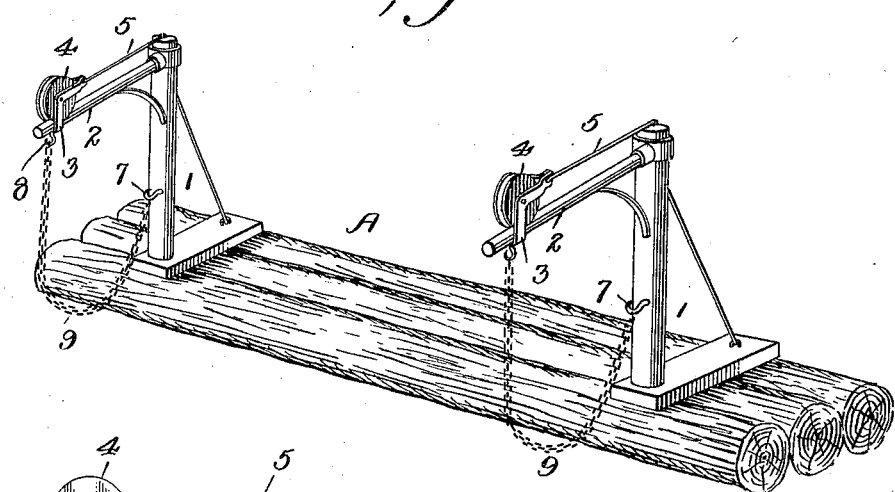
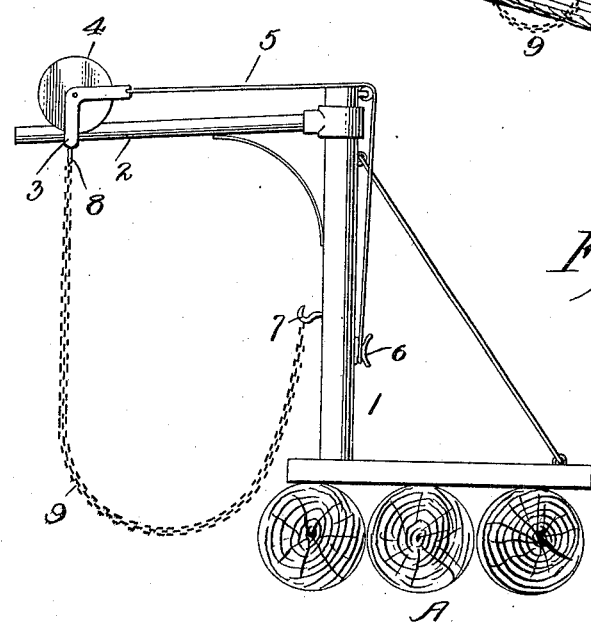
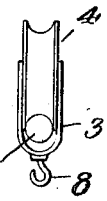

UNITED STATES PATENT OFFICE.

FRANK STUART, OF NORTHFIELD, MAINE, ASSIGNOR OF ONE-HALF TO ALEXANDER D. McFAUL, OF MACHIAS, MAINE.

LOG-BUNDLER.

998,651. Specification of Letters Patent. Patented July 25, 1911.

Application filed October 8, 1910. Serial No. 585,995.

*To all whom it may concern:*

Be it known that I, FRANK STUART, a citizen of the United States, residing at Northfield, in the county of Washington and State of Maine, have invented certain new and useful Improvements in Log-Bundlers, of which the following is a specification.

My invention relates to the handling of logs at saw or pulp mills and has for its object the provision of a device mounted on a raft having means for passing chains around a plurality of logs and then attaching the chains to a hoisting hook to be conveyed in the ordinary manner to the mill.

My invention also has for its object the provision of a device that may be mounted on a raft consisting of a few logs so that it is capable of being transported easily and may be used and maneuvered in a limited body of water.

My invention will be described in detail hereinafter and illustrated in the accompanying drawings in which—

Figure 1 is a view in perspective of my improved log bundler, Fig. 2, an end view and Fig. 3, a detail view of the traveler.

In the drawings similar reference characters indicate corresponding parts in all of the views.

A indicates a raft of logs, which in the drawings are shown to be three in number, and, as stated above, one of the advantages of my invention is that it is capable of use on a small raft, but when desired a larger raft may be employed.

My invention consists in the provision of uprights 1 mounted on the raft A, having arms 2 secured thereto and extending over one side of the raft, said arms being inclined downwardly as shown for the purpose hereinafter stated.

3 indicates a traveler movably mounted on arm 2 and having a bearing roller 4 journaled therein that engages the arm 2.

5 designates a rope secured to traveler 3 for moving it up the arm 2 and 6 a cleat secured to upright 1 to which the rope 5 may be attached to maintain the traveler in a fixed position.

7 indicates a hook secured to upright 1 and 8 a hook secured to traveler 3, the two hooks being provided to receive a length of chain 9.

As shown in the drawings two uprights 1 are provided and in operation, the travelers 3 are run down the arms 1 by loosening the ropes 5 from cleats 6 and then held in their adjusted positions by again securing the ropes to the cleats. This spreads the chains 9 so that the logs may be floated therein, after which the travelers are drawn up the inclined arms 2 by hauling on the ropes 5 to gather the logs into a bundle. The chains 9 may then be detached from the hooks 7 and 8 and attached to a hoisting hook or other device of any preferred construction, or the ropes or chains of a hoisting device may be passed around the bundle.

Having thus described my invention, what I claim is—

In a log bundler comprising a raft, upright supports mounted on said raft, inclined arms secured to said supports, a traveler movably mounted on each arm and having a bearing roller mounted therein and engaging the arm, a hook secured to each traveler, a hook secured to each support, chains releasably secured to said hooks, and ropes secured to the travelers to adjust them on the arms.

In testimony whereof I hereto affix my signature in the presence of two witnesses.

FRANK STUART.

Witnesses:
 OSCAR B. FOSTER,
 FRED HARMON.

Copies of this patent may be obtained for five cents each, by addressing the "Commissioner of Patents, Washington, D. C."